United States Patent [19]

Bell

[11] Patent Number: 4,720,145
[45] Date of Patent: Jan. 19, 1988

[54] MOTOR VEHICLE SEAT HINGE

[75] Inventor: Robert L. Bell, Oxford, Mich.

[73] Assignee: Fisher Dynamics Corporation, St. Clair Shores, Mich.

[21] Appl. No.: 18,785

[22] Filed: Feb. 18, 1987

Related U.S. Application Data

[63] Continuation of Ser. No. 594,742, Mar. 29, 1984, abandoned.

[51] Int. Cl.$^4$ .............................................. B60N 1/02
[52] U.S. Cl. .................................... 297/379; 297/216; 297/378
[58] Field of Search ...................... 297/379, 216, 378

[56] References Cited

U.S. PATENT DOCUMENTS

| | | | |
|---|---|---|---|
| 3,628,831 | 12/1971 | Close .................................... | 297/379 |
| 3,973,288 | 8/1976 | Pickles ............................. | 297/379 X |
| 4,279,442 | 7/1981 | Bell .................................... | 297/379 X |
| 4,372,610 | 2/1983 | Fisher, III et al. ............. | 297/379 X |
| 4,438,974 | 3/1984 | Kresky et al. ........................ | 297/379 |
| 4,484,779 | 11/1984 | Suzuki ............................... | 297/379 X |

FOREIGN PATENT DOCUMENTS

47699 3/1982 European Pat. Off. ........... 297/378

Primary Examiner—Kenneth J. Dorner
Assistant Examiner—Laurie K. Cranmer
Attorney, Agent, or Firm—Harness, Dickey & Pierce

[57] ABSTRACT

An improved motor vehicle seat hinge mechanism which includes an inertia sensitive latching device which prevents forward rotation of the seat back in the event of sudden vehicle deceleration. The vehicle seat hinge mechanism according to this invention improves over prior art designs by providing a quadrant component which does not present objectionable rearward protrusions which interfere with rear seat occupants while entering and egressing from the rear seat area and, further, avoids the presentation of sharp projections which could cause tearing and wearing of interior trim fabrics. The seat back hinge mechanism further includes a cam plate which biases the inertia sensitive latching device such that it is in a position to latch when the seat back is in its normal position. Due to the use of the cam plate, the seat hinge according to this invention is less sensitive to malfunctions caused by hinge component misalignment.

12 Claims, 6 Drawing Figures

MOTOR VEHICLE SEAT HINGE

This is a continuation of U.S. patent application Ser. No. 594,742, filed Mar. 29, 1984 entitled "improved Motor Vehicle Seat Hinge", now abandoned.

BACKGROUND AND SUMMARY OF THE INVENTION

The invention relates to a seat hinge, and more particularly, to a seat hinge structure for a motor vehicle employing an internal inertia sensitive element which prevents articulation of the hinge in certain conditions.

Passenger cars having two side doors and a rear occupant seating area generally must be provided with a mechanism which permits the front seat back to be rotated forward, thereby provding sufficient clearance for access to the rear seating area, and to permit entrance to and egress from the rear seating area by passengers. In the past, manually operated hinge mechanisms were pervalent. Theses devices required the passenger to manually actuate a lever or other mechanism in order to unlatch the seat back, thereby allowing it to be swung forward. Latching mechanisms are necessary in order to comply with Federal Motor Vehicle Safety Standards (FMVSS) which require that the front seat back be held in a nearly vertical position when the vehicle is subjected to suden decelrations, as would be experienced during a frontal impact. The intent of these requirements is to prevent the seat back from striking the front seat occupants in such conditions. In an effort to improve comfort and convenience of motor vehicles, manufacturers have recently provided inertia sensitive seat back hinge mechanisms. These devices empoly an internal inertia sensitive element which, when subjected to high rates of deceleration, causes the seat back to be locked, thereby preventing it from moving forward due to the force of such deceleration. Under normal circumstances, however, the rear seat passenger may simply push the front seat back forward without first actuating a release lever.

An additional customer feature which is being provided in modern motor vehicles in increasing numbers are reclining devices which permit the angle of the front seat back relative to the seat bottom to be changed as desired by the seat occupant.

Many seat back hinge mechanisms having an inertia sensitive latch and a reclining feature have been heretofore proposed and implemented. One such design, which is described by U.S. Pat. No. 4,372,610, issued on Feb. 8, 1983, to A. J. Fisher III, et al, which in assigned to the assignee of the application, empolys a quadrant attached to the lower hinge structure and features an internal arcuate aperture through which a pin afixed to the upper hinge structure passes as the seat back is moved between normal and forward positions. The quadrant according to the previously mentioned patent, however, presents a protruding edge surface toward the rear seat area when the seat back is rotated forward. This edge surface is objectionable in that rear seat occupants could contact it while entering or egressing the rear seat area. This edge surface also prevents the application of interior trim fabrics over this area due to the potential for wearing or tearing of the trim.

During use, motor vehicle seats are subjected to significant force loadings exerted by the weight of the occupants during cornering manevers and due to vehicle vibrations. These loadings and others acting on the seat, such as those imposed when occupants grasp or push the seats while entering or egressing the vehicle, may cause misalignment between the seat back and bottom to occur. Moreover, precise alignment between these structures cannot be guaranteed during the production process due to ordinary component fabrication and assembly tolerance variations. Misalignment between the seat bottom and back structures can interfere with the proper functioning of inertia sensitive latch mechanisms. Consequently, it is desirable to provide a seat hinge mechanism which is tolerant to seat structure misalignment.

In view of the foregoing, it is a principal object of this invention to provide an improved motor vehicle seat hinge structure having a quandrant component which does not present an objectionable protruding edge surface to rear seat occupants when the front seat is moved forward. It is yet another principal object of this invention to provide an improved seat hinge structure including an inertia sensitive element which is relatively insensitive to misalignment between the seat back and seat bottom structures.

Additional benefits and advantages of the present invention will become apparent to those skilled in the art to which this invention relates upon a reading of the described preferred embodiments of this invention taken in conjuction with the accompanying drawings.

DETAILED DESCRIPTION OF THE INVENTION

References to rearward and forward directions contained within this document are made with regard to the motor vehicle with which the invention is preferably employed, Decelerations are defined as being caused by loads exerted on the vehicle in a direction to oppose forward motion of the vehicle.

Figures 1, 2:
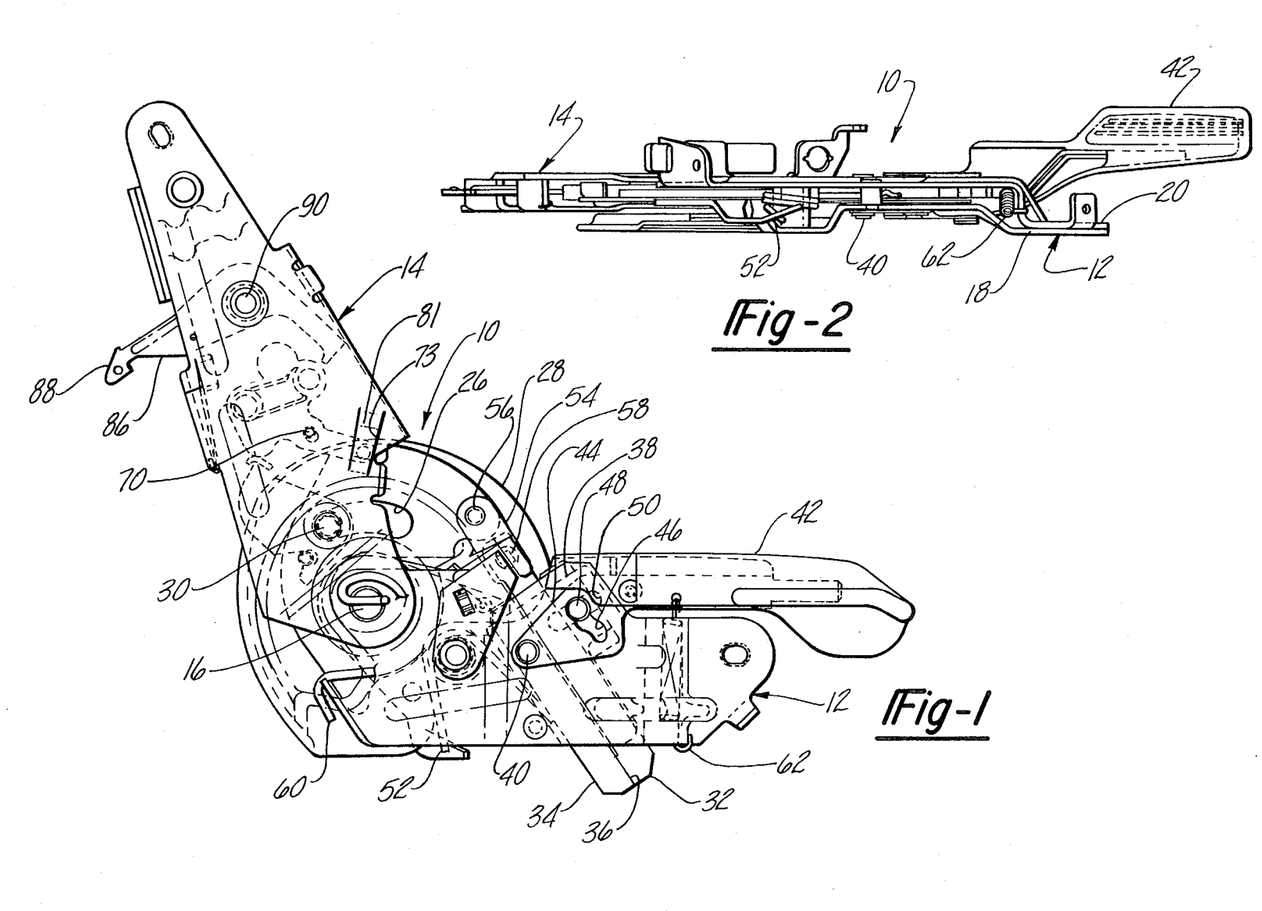
FIG. 1 is a side elevational view of the seat hinge mechanism according to the teachings of the present invention.
FIG. 2 is a plan view of the hinge mechanism show by FIG. 1.
Figures 3, 5, 6:
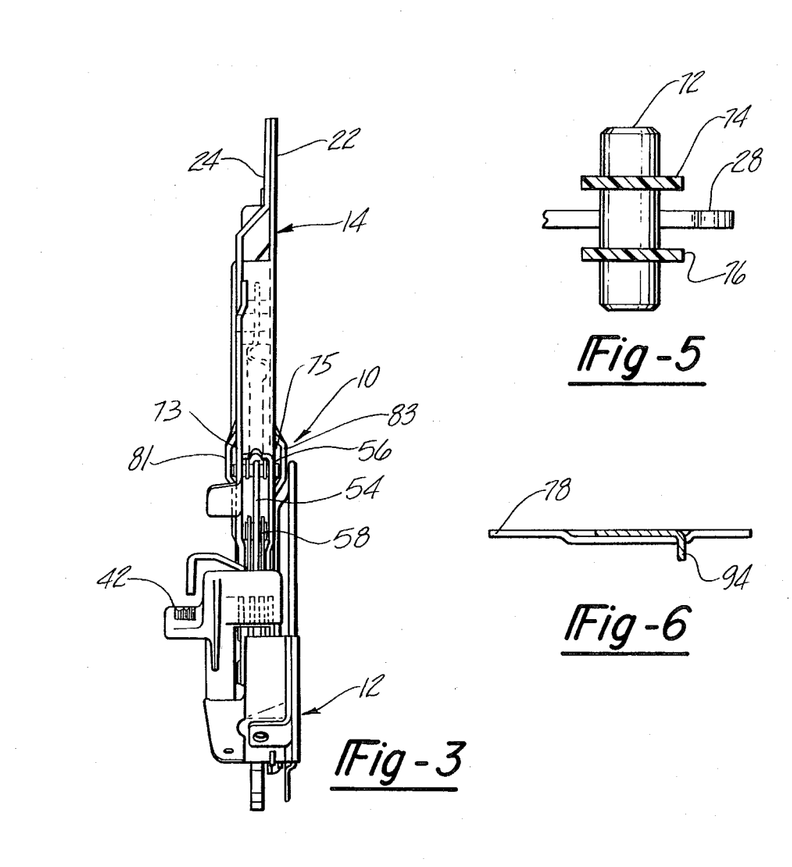
FIG. 3 is a front view of the seat hinge mechanism shown by FIG. 1.
FIG. 5 is a cross-section view taken along line 5—5 of FIG. 4 showing details of the configuration of the latch and quandrant according to this invention.
FIG. 6 is a cross-sectional view taken along line 6—6 of FIG. 4 showing details of the configuration of the cam plate according to this invention.

A motor vehicle seat hinge mechanism according to this invention is shown completely assembled in FIGS. 1, 2, and 3 and is generally designated by reference character 10. The embodiemnt of hinge 10 described herein by the accompanying figures is intended to be positioned at the left-hand side of a motor vehicle driver's seat. A hinge structure useful for a front passenger seat would employ components which are mirror image replications of those described herein. Hinge 10 includes a lower hinge structure 12 which is attached to the seat bottom frame (not shown). Upper hinge structure 14 is attached to the seat back frame (not shown) and is adapted to pivot with respect to lower structure 12 about pivot pin 16. Lower hinge structure 12 is fabricated by attaching two plates, inner lower hinge plate 18 and outer lower hinge plate 20. These plates are attached together by rivets and define a space therebetween within which the additional components, which will hereinafter be described, are disposed. Hinge upper structure 14 is similarly fabricated by attaching two plates, inner upper hinge plate 22 and outer upper hinge plate 24. These plates are also formed to define a space therebetween. The degree of angular motion of upper hinge structure 14 with respect to lower hinge structure 12 and therefore between the seat back and bottom is determined by the angular extent of slot 26 formed within quadrant 28. Pin 30, which is affixed to upper hinge structure 14, moves within slot 26 as the upper hinge structure is rotated with respect to the lower hinge structure about pivot pin 16.

The position of slot 26 and pin 30 shown by the Figures is displaced toward a forward direction as compared to the positioning of these similar elements as described in the previously cited U.S. Pat. No. 4,372,610. Pin 30 mechanically engages inner upper hinge plate 22 with outer upper hinge plate 24, and therefore, positioning the pin toward the lateral center of these plates results in better control of the spacing therebetween.

Although not necessary for the successful practice of this invention, seat hinge 10 includes, as an added occupant comfort feature, a recliner mechanism which permits the seat back angle to be adjusted. The position of quadrant 28 with respect to lower hinge structure 12 is controlled by the positioning of recliner arm 32, which is movable linearly with respect to lower hinge structure 12 in order to effect various reclined seat back positions. As recliner arm 32 is positioned at various longitudinal locations, the positioning of quadrant 28 with respect to lower hinge structure 12 is changed by rotation of the quadrant about pivot pin 16, such that the rearward extent of slot 26 is also changed. It is this rearward position of slot 26 that controls the angle of the upper hinge structure with respect to lower hinge structure 12 and consequently between the seat back and bottom. The range of angular variation in the positioning of quadrant 28 is controlled by quadrant stops 31 and 33 which interfere with stop surfaces of the lower hinge structure.

Variations in the longitudinal positioning of recliner arm 32 are achieved by providing the arm with a toothed surface which engages with a toothed surface of pawl 34. The teeth of pawl 34 extend along approximately one-third of the length thereof, the remainder portion having a smooth surface 36. Pawl 34 and recliner arm 32 are biased toward one another by arm clamp 38. Pawl 34 is pivotably attached to lower hinge structure 12 by pin 40. Recliner arm 32 is caused to be selectively clamped or unclamped between pawl 34 and arm clamp 38 by causing the arm clamp to be moved toward or away from the pawl in response to actuation of recliner handle 42. Recliner handle 42 includes recliner handle plate 44 which forms cam slot 46 and is also pivotably attached to recliner bottom structure 12. Recliner handle 42 is biased in a clockwise direction to the position shown by FIG. 1 by coil spring 62. Pin 48 is attached to arm clamp 38 and moves within cam slot 46 and elongated slot 50 formed by plates 18 and 20. Therefore, as recliner handle 42 is moved between the positions shown in FIG. 1 to a displaced counterclockwise position, arm clamp 38 is caused to move from a lower position within slot 50 to an upper position, thereby unclamping recliner arm 32. When arm 32 is not being clamped between pawl 34 and arm clamp 38, the toothed portion of the pawl is caused to move away from the toothed portion of arm 32, thereby permitting the angular positioning of quadrant 28 and therefore the seat back position to be changed as desired by the seat occupant. Pawl spring 52 causes the pawl to be rotated to a slight extent in a counterclockwise direction with respect to pivot pin 40, thereby insuring separation of the toothed portions of the pawl and the recliner arm. Recliner arm 32 is attached to quadrant 28 by link 54 and by pins 56 and 58. Adjustment of the position of the seat back is made easier by providing pivot pin spring 60 which engages pivot pin 16 and lower hinge structure 12 and resiliently biases the seat back in a clockwise forward position, with respect to the orientation shown by FIG. 1. Such biasing permits the occupant to easily adjust the seat back positioning while seated simply by raising recliner handle 42 and pushing against the seat back until the desired angular position is obtained, whereupon the recliner handle is returned to its normal position.

Figure 4:
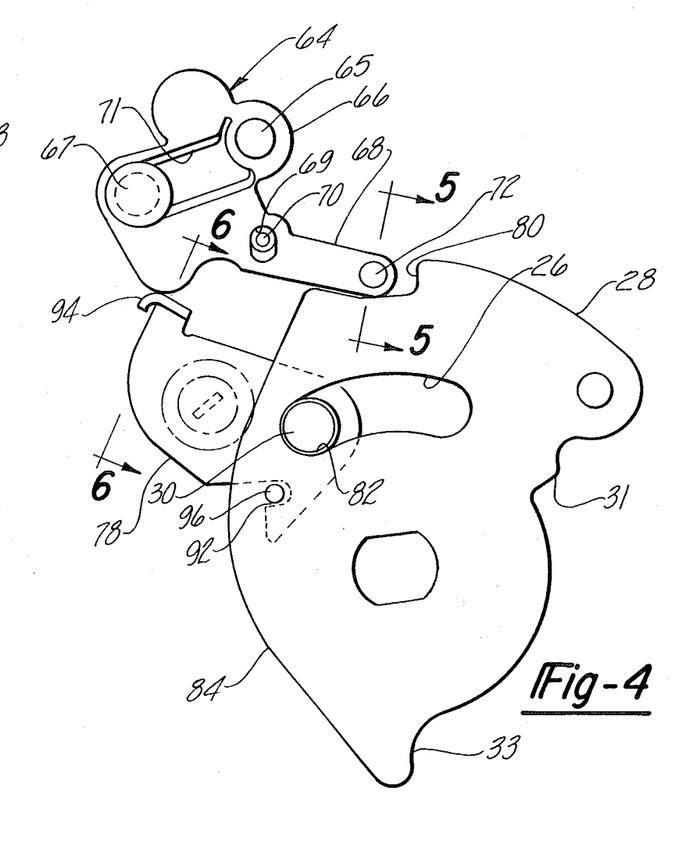
FIG. 4 is a side elevational view showing the rolling weight latch, quandrant and cam plate according to the present invention.

In accordance with the instant invention, the inertia sensitive mechanism of vehicle seat hinge 10 principally includes a rolling weight inertia latch 64 which interacts with quandrant 28 and responds to vehicle deceleration to prevent forward displacement of the seat back. A detailed view of the configuration and cooperation between these components is best described with reference to FIG. 4. Latch 64 includes upper weighted section 66, lower engaging portion 68 and bore 69 therebetween. Upper weighted section 66 includes fixed weight 65 and rolling weight 67, which is permitted to roll within slot 71 in response to vehicle deceleration. Pivot pin 70 is attached to upper hinge structure 14 and passes through bore 69. Pivot pin 70 and bore 69 cooperate to form a low friction bearing permitting free rotation of latch 64. The latch is configured such that its centroid of mass (center of gravity) lies above pivot pin 70 so that, upon vehicle deceleration, rolling weight 67 moves forward within slot 71 and the latch is caused to rotate in a clockwise direction, with respect to the orientation shown by FIG. 1. As best shown in FIG. 5, the engaging portion 68 of latch 64 supports engaging pin 72 within bores in substantially parallel latch surfaces 74 and 76. Engaging pin 72 is prevented from being withdrawn from the bores within surfaces 74 and 76 since it is trapped between locally deformed portions 81 and 83 which form slots 73 and 75 within upper hinge plates 22 and 24. Quadrant 28 includes a notched upper portion defining stop surface 80. Therefore, when a predetermined level of vehicle deceleration is sensed by latch 64, the forward movement of upper hinge structure 14 is limited due to engagement between engaging pin 72 and stop surface 80. Forward movement of upper hinge structure 14 in this situation is prevented due to engagement of engaging pin 72 with stop surface 80 of quandrant 28 and the edges of slots 73 and 75. Under normal circumstances, the seat back may be freely rotated forward, since engaging pin 72 is permitted to escape engagement with surface 80, as will be explained in detail below. Such escapement is provided by placement of the centroid of mass (center of gravity) of latch 64 such that the latch is normally biased by gravity in a counterclockwise direction.

In order to provide enhanced reliability of engagement between latch 64 and stop surface 80, it is desirable to normally position engaging pin 72 so that it is in a position to engage the stop surface when upper hinge structure 14 is rotated in a forward position. In accordance with a principal feature of this invention, cam plate 78 performs this function. Cam plate 78 is best described with reference to FIG. 4 and includes bore 82 which permits the cam plate to be mounted for rotation about pin 30. Cam plate 78 further includes an arc-shaped slot 92 and bent over tab 94. Pin 96 is affixed to quandrant 28 and is guided within slot 92 as upper hinge structure 14 is rotated from a folded position to a normal upright position. When upper hinge structure 14 is in the position shown by FIG. 1, the interaction between pin 96 and slot 92 biases cam plate 78 in a clockwise direction. Cam plate 78 and latch 64 are oriented with respect to one another so that contact between tab 94 and the latch occurs at a point rearwardly of the center of rotation of the latch, thereby urging the latch to rotate in a clockwise direction. Such biasing results, in a positioning of latch 64 in the latched position wherein engaging pin 72 is in close proximity with stop surface 80 of the quandrant. When upper hinge structure 14 is moved toward a forward position and the vehicle is not subjected to a high deceleration force, pin 96 escapes from slot 92, whereupon cam plate 78 rotates counterclockwise due to its center of gravity such that biasing against latch 64 is relieved, thereby permitting withdrawal of engaging pin 72 from its position adjacent stop surfce 80. Significantly, however, it will be noted from the drawing in FIG. 4, that upon initial forward movement of the upper hinge structure 14 in this situation, the slot 92 of cam plate 78 contacts pin 96 to thereby positively initiate the counterclockwise rotation of cam plate 78. This insures that any static frictional forces which might otherwise inhibit the free rotation of cam plate 78 are positively overcome by such mechanical engagement. Once upper hinge structure 14 is moved slightly toward a forward position, slot 92 and pin 96 engage to force cam plate 78 in a counterclockwise direction through positive mechanical engagement. The provision of such engagement insures that cam plate 78 will be rotated to permit latch 64 to move to a disengaged position despite the existence of frictional forces acting on the cam plate which would inhibit movement of the cam plate due to gravity biasing alone. By providing positive engagement causing cam plate 78 to move, the reliability of the system is increased substantially since the liklihood of the cam plate becomes inoperative due to corrosion, wear, foreign matter, etc. is minimized. If, however, the vehicle is subjected to a high deceleration level, latch 64 remains in its latched or clockwise rotated position, thereby preventing pin 72 from escaping from contact with stop surface 80. This design is relatively insensitive to misalignment which may occur between lower hinge structure 12 and upper hinge structure 14 since latch stop surface 80 may engage pin 72 at any point across its lateral width between surfaces 74 and 76.

With reference to FIG. 1, when the upper hinge structure is rotated fully forward, surface 84 of quandrant 28, which is presented to the rear seat occupant area, is relatively smooth and nonobtrusive, thereby avoiding problems associated with prior art quandrant configurations. In addition, hazards of tearing or abraiding of the seat trim material are avoided in the event that such trim material is used to enclose the seat back recliner mechanism.

An emergency releasing mechanism is provided to enable rear seat occupants to extract themselves from the vehicle in the event of failure of the inertia sensitive components of the seat hinge or in the event that vehicle inclination causes the hinge mechanism to latch. Therefore, release actuator 86 is provided having a rearwardly projecting portion 88 which may be manipulated by the rear seat occupants such that latch 64 is caused to rotate, as in FIG. 4, in a counterclockwise position about pivot pin 70, thereby withdrawing engaging pin 72 from engagement with stop surface 80 and permitting the seat back to be folded forward.

While the above description constitutes the preferred embodiment of the present invention, it will be appreciated that the invention is susceptible to modification, variation and change without departing from the proper scope and fair meaning of the accompanying claims.

I claim:

1. A hinge mechanism for controlling rotation of a motor vehicle seat back with respect to the seat bottom, comprising:

a lower hinge structure supporting said seat bottom,
an upper hinge structure supporting said seat back,
first pivot means rotatably attaching said lower hinge structure to said upper hinge structure, thereby permitting said upper hinge structure to be rotated from a first substantially vertical position to an angularly displaced second forward position, inertia sensitive latch means pivotably attached to said upper hinge structure by second pivot means, said latch means having engaging means,
quadrant means affixed to said lower hinge structure forming a stop surface, said stop surface interfering with said enaging means in the event of deceleration of said motor vehicle above a predetermined level thereby preventing movement of said upper hinge structure from said first to said second position, and
a cam plate rotatably attached to said upper hinge structure by third pivot means, said quadrant means having cam surfaces which cooperate with cam surfaces of said cam plate such that said cam plate is biased into engagement with said latch means thereby maintaining said engaging means in close proximity with said stop surface when said upper hinge structure is in said first position, and said cam plate becoming disengaged from said latch means by gravity thereby relieving said bias when said upper hinge structure is displaed from said first position.

2. The hinge mechanism according to claim 1, wherein said cam plate further has a tab which engages said latch means when said cam plate is biasing said latch means.

3. The hinge mechanism according to claim 1, wherein said latch means is a rolling weight type latch having an upper weighted section, a lower engaging section with said second pivot means therebetween.

4. The hinge mechanism according to claim 2, wherein said cam plate tab portion contacts said latch means upper weighted section when said upper hinge structure is said first position.

5. The hinge mechanism according to claim 1 wherein said engaging means comprises an engaging pin installed in one or more bores formed by said latch means.

6. The hinge mechanism according to claim 1, wherein said quandrant forms an arcuate slot, and a third pin afixed to said upper structure disposed in said slot whereby said slot controls the angular extent of relative motion between said upper and said lower hinge structures.

7. The hinge mechanism according to claim 1, wherein said quandrant means is rotatable about said first pivot means and recliner means are provided which enables the angular positioning of said quadrant means with respect to said lower hinge structure to be adjusted thereby varying the angle of said first upper hinge structure position.

8. a hinge mechanism for controlling rotation of a motor vehicle seat back with respect to the seat bottom, comprising:
   a lower hinge structure supporting said seat bottom and defining an arcuate slot,
   an upper hinge structure supporting said seat back,
   first pivot means rotatably attaching said lower hinge structure to said upper hinge structure, thereby permitting said upper hinge structure to be rotated from a first substantially vertical position to an angularly displaced second forward position,
   a stop pin affixed to said upper hinge structure and positioned within said lower hinge structure arcuate slot thereby limiting the extent of rotation of said upper hinge structure with respect to said lower hinge structure,
   inertia sensitive latch means pivotably attached to said upper hinge structure by second pivot means,
   an engaging pin installed within bores formed in said latch means,
   a stop surface formed on said lower hinge structure, said stop surface interfering with said engaging pin in the event of deceleration of said motor vehicle above a predetermined level thereby preventing movement of said upper hinge structure from said first to said second position, and
   a cam plate rotatably attached to said upper hinge structure by said stop pin, said lower hinge structure having cam surfaces which cooperate with cam surfaces of said cam plate such that said cam plate is biased against said latch means thereby maintaining said engaging pin in close proximity with said stop surface when said upper hinge structure is in said first position and said cam plate becoming disengaged from said latch means by gravity thereby relieving said bias when said upper hinge structure is displaced from said first position.

9. A hinge mechanism for controlling rotation of a motor vehicle seat back with respect to the seat bottom, comprising:
   a lower hinge structure supporting said seat bottom,
   an upper hinge structure supporting said seat back,
   a first pivot means rotatably attaching said lower hinge structure to said upper hinge structure, thereby permitting said upper hinge structure to be rotated from a first substantially vertical position to an angularly displaced second forward position,
   inertia sensitive latch means pivotably attached to said upper hinge structure, said latch means having engaging means,
   quandrant means affixed to said lower hinge structure including a stop surfce, said stop surface interfering with said engaging means in the event of deceleration of said motor vehicle above a predetermined level thereby preventing movement of said upper hinge structure from said first to said second position, and
   a post affixed to said quandrant means, and
   a cam plate rotatably attached to said upper hinge structure, said cam plate having a slot, said post cooperating with said cam plate slot such that said cam plate is biased into engagement with said latch means when said upper hinge structure is in said first position and said cam plate becoming disengaged from said latch means thereby relieving said bias when said upper hinge structure is displaced from said first position.

10. A hinge mechanism for controlling rotation of a motor vehicle seat back with respect to the seat bottom, comprising:
    a lower hinge structure supporting said seat bottom,
    an upper hinge structure supporting said seat back,
    first pivot means rotatably attaching said lower hinge structure to said upper hinge structure, thereby permitting said upper hinge structure to be rotated from a first substantially vertical position to an angularly displaced second forward position,
    inertia sensitive latch means pivotabbly attached to said upper hinge structure by second pivot means, said latch defining an engaging portion having a pair of spaced parallel surfaces lying in planes perpendicular to the axis of rotation of said second pivot means, said engaging portion defining one or more bores,
    an engaging pin installed in said one or more bores of said lacth means engaging portion,
    quadrant means affixed to said bottom hinge structure forming a stop surface, said stop surface interfering with said engaging pin in the event of deceleration of said motor vehicle above a predetermined level thereby preventing movement of said upper hinge structure from said first to said second position, and
    a cam plate rotatably attached to said upper hinge structure, said quadrant cooperating with said cam plate such that said cam plate is biased against said latch means thereby maintaining said engaging pin in close proximity with said stop surface when said upper hinge structure is in said first position and said cam plate relieving said bias when said upper hinge structure is displaced from said first position.

11. A hinge mechanism for controlling rotation of a motor vehicle sat back with respect to the seat bottom, comprising:
    a lower hinge structure supporting said seat bottom;
    an upper hinge structure supporting said seat back;
    first pivot means rotatably attaching said lower hinge structure to said upper hinge structure, thereby permitting said upper hinge structure to be rotated from a first substantially vertical postion to an angularly displaced second forward position;
    quandrant means affixed to said lower hinge structure and having a stop surface;
    inertia sensitive latch means pivotably attached to said upper hinge structure by a second pivot means, said latch means having engaging means adapted to contact said stop surface when said latch means is in a latched position and to clear said stop surface and permit forward rotation of said upper hinge structure when said latch means is pivoted to an unlatched position, such that in the event of deceleration of said motor vehicle above a predetermined level said latching means is maintained in said latched position so that said engaging means contacts said stop surface thereby preventing movement of said upper hinge structure from said first to said second position; and a cam plate rotably attached to said upper hinge structure by a third pivot means, and having cam surfaces that engage said quadrant means to bias said cam plate into engagement with said latch means when said upper hinge structure is in said first position thereby maintaining said latch means in said latched position and further to force said cam plate to become disengaged from said latch means when said upper hinge structure is displaced from said first position thereby permitting said latching means to pivot to said unlatched position.

12. The hinge mechanism according to claim 18, wherein said cam surfaces comprise a slot located in said cam plate and said quandrant includes a post which cooperates with said slot, said post engaging with said cam plate slot such that said cam plate is biased into engagement with said latch means when said upper hinge structure is in said first position and said cam plate slot engaging with said post to force said cam plate out of engagement with said latch means, thereby relieving said bias when said upper hinge structure is displaced from said first position.

* * * * *

UNITED STATES PATENT AND TRADEMARK OFFICE
CERTIFICATE OF CORRECTION

PATENT NO. : 4,720,145

DATED : January 19, 1988

INVENTOR(S) : Robert L. Bell

It is certified that error appears in the above-identified patent and that said Letters Patent is hereby corrected as shown below:

Column 1, line 5, "improved" should be --Improved--.

Column 1, line 10, "The" should be --This--.

Column 1, line 21, "Theses" should be --These--.

Column 1, line 28, "suden" should be --sudden--.

Column 1, line 34, "empoly" should be --employ--.

Column 1, line 51, "in" should be --is--.

Column 1, line 52, "the" (second occurrence) should be --this--.

Column 1, line 52, "empolys" should be --employs--.

Column 2, line 33, "show" should be --shown--.

Column 2, line 38, "quandrant" should be --quadrant--.

Column 2, line 40, "cross-section" should be --cross-sectional--.

Column 2, line 58, "embodiemnt" should be --embodiment--.

Column 3, line 30, "quandrant" should be --quadrant--.

Column 3, line 35, "quandrant" should be --quadrant--.

Column 3, line 43, "quandrant" should be --quadrant--.

UNITED STATES PATENT AND TRADEMARK OFFICE
CERTIFICATE OF CORRECTION

PATENT NO. : 4,720,145

DATED : January 19, 1988

INVENTOR(S) : Robert L. Bell

It is certified that error appears in the above-identified patent and that said Letters Patent is hereby corrected as shown below:

Column 4, line 5, "quandrant" should be --quadrant--.

Column 4, line 11, "quandrant" should be --quadrant--.

Column 4, line 26, "quandrant" should be --quadrant--.

Column 4, lines 57 - 58, "quandrant" should be --quadrant--.

Column 5, line 28, "surfce" should be --surface--.

Column 6, lines 26 - 27, claim 1, a new paragraph should start with the word "inertia".

Column 6, line 47, claim 1, "displaed" should be --displaced--.

Column 6, line 67, claim 6, "afixed" should be --affixed--.

Column 7, line 10, claim 8, "a" should be --A--.

Column 7, line 62, claim 9, "surfce" should be --surface--.

Column 8, line 20, claim 10, "pivotabbly" should be --pivotably--.

UNITED STATES PATENT AND TRADEMARK OFFICE
CERTIFICATE OF CORRECTION

PATENT NO. : 4,720,145

DATED : January 19, 1988

INVENTOR(S) : Robert L. Bell

It is certified that error appears in the above-identified patent and that said Letters Patent is hereby corrected as shown below:

Column 8, line 28, claim 10, "lacth" should be --latch--.

Column 8, line 44, claim 11, "sat" should be --seat--.

Column 10, line 1, claim 12, "18" should be --11--.

Signed and Sealed this

Ninth Day of August, 1988

Attest:

DONALD J. QUIGG

Attesting Officer

Commissioner of Patents and Trademarks